Sept. 10, 1968   R. P. TOTTEN   3,400,978
SAFETY BELT CONTAINER
Filed April 3, 1967   2 Sheets-Sheet 1

INVENTOR
RALPH P. TOTTEN

Sept. 10, 1968  R. P. TOTTEN  3,400,978
SAFETY BELT CONTAINER
Filed April 3, 1967  2 Sheets-Sheet 2
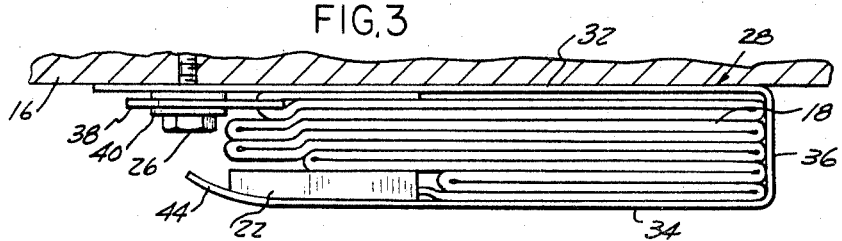
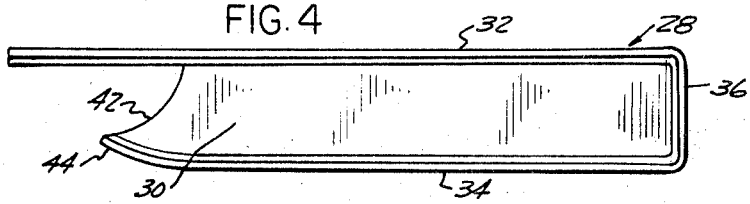
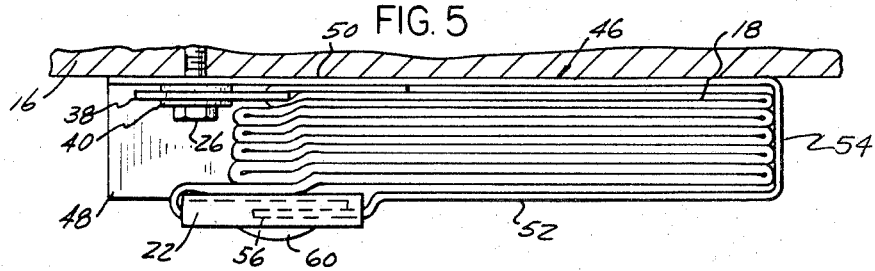
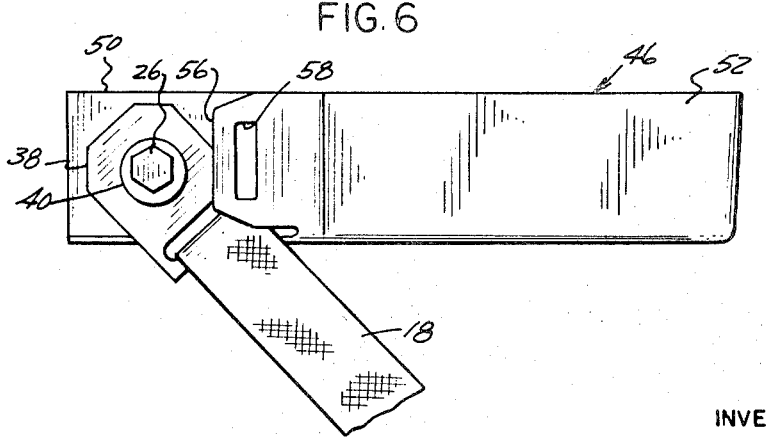
INVENTOR
RALPH P. TOTTEN
BY Hauke, Krass, & Gifford
ATTORNEYS

United States Patent Office 3,400,978
Patented Sept. 10, 1968

3,400,978
SAFETY BELT CONTAINER
Ralph P. Totten, Berkley, Mich., assignor to Jim Robbins Seat Belt Company, Royal Oak, Mich., a corporation of Delaware
Filed Apr. 3, 1967, Ser. No. 627,719
12 Claims. (Cl. 297—389)

ABSTRACT OF THE DISCLOSURE

A container for storing a safety seat belt anchored to an upper portion of the vehicle. The container has a bottom, upwardly directed side walls and an open top. The belt anchor bolt secures one of the side walls to the vehicle so that the belt can be folded into a series of parallel lengths and inserted through the open top for storage adjacent its anchored end. The side walls and bottom of the container are open adjacent the anchor bolt to permit extension of the belt to an operating position without interference with the container structure.

An alternate container has a tongue-shaped section formed in a side wall for positively engaging the belt buckle.

BACKGROUND OF THE INVENTION

1. Field of the invention

This invention relates to storage containers for vehicle safety seat belts and more specifically to a contaianer for storing a seat belt anchored to an upper structural portion of the vehicle behind the seated position of the occupant associated with the belt.

2. Description of the prior art

Occupant restraining systems including an arrangement of belt sections for embracing the upper torso of the occupant of a vehicle seat have become increasingly popular as the result of recent interest in improved automotive safety features. One form of restraining system of this type employs a section of belting anchored to an upper portion of the vehicle and slightly behind the seat of the occupant with an operating end extending forwardly from the anchor point and over a shoulder of the occupant. The free end of the belt has a coupling section engageable with a complementary coupling section attached to a lower section of belting so that when the two belt sections are joined together, the torso of the occupant is effectively restrained from displacement with respect to the seat.

A problem associated with a belt restraining system employing an overhead mounted belt section is the lack of convenient means for storing the belt section when it is not being actively utilized as part of the restraining system. A storage container for readily storing the unused belt in an attractive arrangement while permitting a convenient removal of the belt from the container for extension from its anchor point without interference with the container structure has not been available.

Another problem associated with the storage of overhead mounted seat belts relates to a belt having a buckle attached to its free end and engageable with a tongue-shaped section of a lower belt section. The problem manifests itself when the vehicle is involved in a collision or other occurrence producing violent forces acting on the vehicle and the overhead belt section is not employed by the occupant for its intended function as part of a restraining system. The buckle has a mass which reacts to the forces produced by the collision by moving in an uncontrolled manner within the interior of the vehicle and exposing the occupants to an injury producing impact.

The broad purpose of the present invention is to provide means for conveniently and attractively storing an overhead mounted seat belt and restraining the buckle section from uncontrolled movements.

SUMMARY

The preferred embodiment of the present invention, which will be subsequently described in greater detail, takes the form of an elongated open-topped container having a bottom and upwardly directed side walls formed of an attractive plastic. One side wall of the container is apertured to accommodate the bolt anchoring the seat belt so that the container is mounted by the anchor bolt and the belt stored adjacent its anchor point. The side walls and bottom portions of the container have an aperture extending downwardly from the open top adjacent the anchor bolt so that the belt can be freely extended to an occupant restraining position without interference from the container structure. The belt is stored within the container by folding it into a series of short parallel sections which are inserted through the open top so that a longitudinal side edge of the belt rests on the bottom of the container. The container has a suitable depth so that the stored belt is hidden from view while at the same time permitting the occupant an easy access to the belt.

Preferably, the container has a width permitting a coupling section attached to the free end of the belt to be inserted in the container and wedged between the folded belt and the side walls. Thus, the coupling section is restrained from uncontrolled movement in the event of the vehicle experiencing a collision or other violent impact.

An alternate embodiment of the present invention contemplates an open-topped storage container having a pair of elongated side walls connected by a bottom section and an end wall section connecting the forward end of the side walls. The belt anchor bolt connects the rearward open end of one side wall to the vehicle structure. The open end of the opposite side wall is shaped to form a buckle-engaging tongue. This form of the invention is useful for storing an overhead mounted belt having a conventional buckle attached to its free end. The portion of the belt adjacent the anchored end is folded into a series of short lengths and inserted through the open top. The buckle is snapped into engagement with the tongue so that it is locked to the container thereby preventing uncontrolled movements.

It is therefore an object of the present invention to provide a container for storing an overhead mounted vehicle seat belt adjacent its anchored end while permitting the belt to be conveniently withdrawn to an extended operating position.

It is another object of the present invention to provide a container for storing an overhead mounted safety seat belt having a buckle attached to its free operating end by providing an open-topped container mounted adjacent the belt anchor bolt, the container having a length permitting the belt to be folded into short lengths and inserted therein, and one of the side walls of the container contoured to positively engage the buckle.

It is a still further object of the present invention to provide means for retaining a buckle member carried at the free end of an unused seat belt by providing a tongue-shaped element attached to a fixed part of the vehicle and engageable with the buckle.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views in which:

FIG. 3 is a view of the belt storage container illustrated in FIG. 1 but with the belt in the stored position;

FIG. 4 is a view of the bottom of the container of FIG. 1 adjacent the belt anchor bolt;

FIG. 5 is a view of a container illustrating an alternate embodiment of the present invention for storing a belt with a tongue positively engaging the buckle to the container; and FIG. 6 is an elevational view of the buckle-engaging tongue section illustrated in FIG. 5 with the buckle disengaged.

SUMMARY

Figure 1:
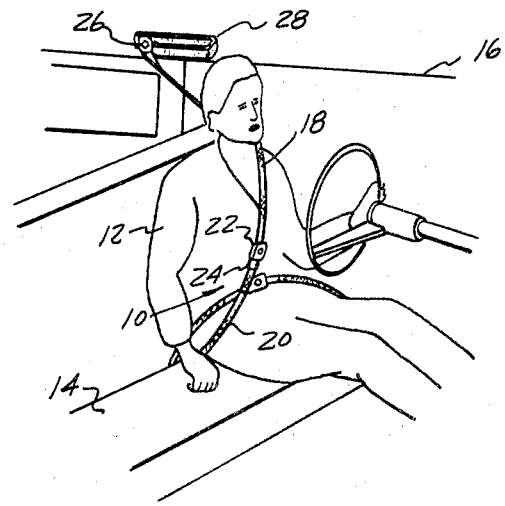
FIG. 1 is a perspective view illustrating an occupant restraining system employing an overhead mounted belt, and a storage container illustrating the preferred embodiment of the present invention for storing the overhead mounted belt.

Now referring to the drawings, FIG. 1 illustrates a belt restraining system 10 embracing an occupant 12 in a seated position on a seat 14 of a vehicle 16.

The belt restraining system 10 includes an overhead mounted belt section 18 joined to a lower belt section 20 having its lower end anchored to a suitable lower portion of the vehicle. The free end of the belt 18 has a conventional buckle section 22 engaged with a tongue section 24 carried by the lower belt 20.

The upper end of the belt 18 is securely fastened by an anchor member 26 to the vehicle 16.

It can be seen that the anchor member 26 is attached to the upper portion of the vehicle and slightly behind the occupant 12 so that the belt extends forwardly to its restraining position. A storage container 28 provides means for storing the overhead mounted belt 18 when it is not in active use.

Figure 2:
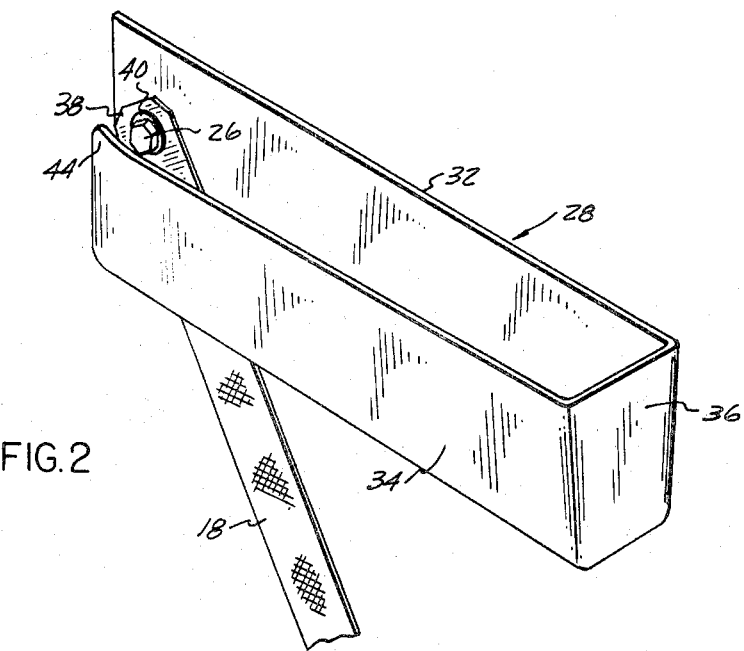
FIG. 2 is an enlarged view of the storage container illustrated in FIG. 1 with the belt in the extended operating position.

Referring to FIGS. 2, 3 and 4, the container 28 has a generally rectangular bottom 30, a pair of long sides 32 and 34 extending upwardly from the bottom 30 and an end section 36 connecting the forward end of the long sides 32 and 34. The container 28 preferably has a depth greater than the width of the belt 18 and a length and a width permitting the belt to be folded into a series of short lengths and inserted through the open top so that the lower longitudinal edge of the belt rests on the bottom 30.

The upper end of the belt 18 has an anchor portion 38 engaged by the anchor member 26 and a washer 40 permitting the belt to be pivoted between an upper stored position wherein the belt extends into the container 28 and a lower operating position wherein it extends toward the occupant 12.

The side wall 32 is apertured adjacent its rearward end to receive the anchor member 26 so that the anchor member functions to secure both the belt 18 and the container 28 to the vehicle 16. As can best be seen in FIG. 4, the bottom 30 is cut away as at 42 and adjacent the anchor member 26 so that the belt 18 can be extended to an operating position without interference with the structure of the container 20.

Preferably the rear portion of the outer wall 34 is tapered toward the inner wall 32 as at 44. Thus, in the stored position, the buckle 22 is wedged between the folded belt 18 and the outer side walls 34 so that it is restrained against uncontrolled movement. In the event of a collision wherein violent forces act on the vehicle 16 so that the mass of the buckle 22 creates a momentum, the forward end 36 of the container and the tapered portion 44 of the side wall confine the movement of the buckle within the container 28.

Now referring to FIG. 5, a container 46 illustrates an alternate embodiment of the present invention for storing the belt 18 adjacent its anchor member 26. Container 46 comprises an elongated bottom 48, an inner side wall 50 and an outer side wall 52 extending upwardly from the bottom 48, and an end section 54 connecting the forward ends of the side walls 50 and 52. The inner side wall 50 is apertured adjacent its rearward end to accommodate the belt anchor member 26 so that the container 46 is attached to the upper portion of the vehicle 16.

The rearward end of the side wall 52 has a tongue-shaped section as can best be seen in FIG. 6. The tongue 56 has a configuration similar to the conventional buckle-engaging tongue 24 attached to the lower belt portion 20 and includes an aperture 58.

The belt 18 is stored in container 46 in a manner similar to that described with reference to the embodiment illustrated in FIG. 3, that is, with the body of the belt folded into a series of short lengths and inserted in the open top of the container 46 so that the lower edge of the belt rests on the bottom 48. However, the buckle 22 attached to the free end of the belt 18 is engaged with the tongue portion 56 so that a locking member (not shown) carried by the buckle 22 is received by the aperture 58. Thus, the buckle 22 is positively retained to the container 46 when the belt 18 is in the stored position. The buckle 22 can be readily snapped into engagement with the tongue 56 and easily and conveniently disengaged by depressing a release element 60 carried by the buckle.

This alternate form of container 46 illustrating the invention permits the unused belt 18 to be easily stored in a hidden position while the buckle 22 is locked from movement produced by uncontrolled exterior forces. Thus, in the event the occupant 12 inadvertently fails to employ the belt 18 in its restraining position while the vehicle 16 is being operated, the forces generated by a collision will not cause the buckle 22 to move in an uncontrolled manner within the interior of the vehicle.

Although I have described my invention in its simplest terms, it is to be understood that various changes and revisions can be made therein without departing from the spirit of the invention as expressed in the scope of the appended claims.

I claim:

1. A belt storage means for storing a vehicle safety seat belt, said seat belt having an anchored end attached to a structural portion of said vehicle and a free end forming part of an occupant restraining system, comprising a container having an elongated generally rectangular bottom, side walls extending upwardly from said bottom to define an open top, one of the long side walls adapted to accommodate a belt anchoring member, said belt anchoring member fastening said container to a structural portion of said vehicle, and said container having an aperture extending downwardly from said open top, so that said container provides means for storing the seat belt adjacent its anchored end while permitting extension of the seat belt in an occupant restraining position without interference with the container side walls.

2. The invention as defined in claim 1, wherein said container is secured to an upper structural portion of said vehicle and rearwardly of the seated position of the occupant associated with the seat belt.

3. The invention as defined in claim 2, wherein said aperture extends downwardly from the open top, through a side wall and into the bottom to permit the belt to extend generally downwardly from the belt anchoring member in the occupant-restraining position.

4. The invention as defined in claim 3, wherein said container has a length less than the extended length of said seat belt and a depth accommodating the width of said seat belt so that said belt is stored by arranging said belt into a series of generally parallel sections connected by return folds and inserted into said container through the open top so that a longitudinal side edge of said seat belt is seated on said bottom.

5. The invention as defined in claim 4, wherein the free end of said seat belt has a coupling section, and said container has a width permitting said coupling section to be stored within said side walls.

6. The invention as defined in claim 4, wherein the free end of said belt has a coupling section and including means for engaging said coupling section to said container.

7. The invention as defined in claim 4, wherein the free end of said seat belt has a coupling section, and the side wall of said container has a retainer section formed to engage said coupling section.

8. The invention as defined in claim 4, wherein the free end of said seat belt has a coupling section engageable with a complementary coupling section when said seat is in the occupant restraining position, and the side wall of said container has a retainer section with a shape corresponding to said complementary coupling section so that said coupling is engageable with said retainer section when said seat belt is not in the occupant-restraining position.

9. The invention as defined in claim 8, wherein said coupling carried by the free end of said seat belt comprises a buckle with a tongue receiving aperture, and said retainer section of said container is contoured to the shape of a tongue engageable with said buckle so that the buckle can be positively engaged with said container with said seat belt stored within the side walls of said container.

10. The invention as defined in claim 9, wherein said belt anchoring member secures the end of one of said long side walls to said vehicle, said retainer section is arranged in the corresponding end of the opposite of said long side walls, and said tongue forms a part of the aperture accommodating the belt in its extended position.

11. Means for mounting the buckle of a vehicle safety seat belt arranged in a non-operating position, comprising a member having a tongue-shaped portion shaped to engage said buckle; and means for mounting said member to a structural portion of the vehicle.

12. The invention as defined in claim 11, wherein said belt has a free end, said buckle being attached to said free end, and said mounting means anchoring the end of the belt opposite said free end to said structural portion of the vehicle.

References Cited

UNITED STATES PATENTS

| | | | |
|---|---|---|---|
| 2,566,837 | 9/1951 | Huelsmeyer | 24—66 |
| 2,686,644 | 8/1954 | Pratt | 248—90 |
| 2,806,737 | 9/1957 | Maxwell | 280—150 |
| 2,834,606 | 5/1958 | Bertrand | 280—150 |
| 3,243,233 | 3/1966 | Davis | 297—389 |
| 3,300,248 | 1/1967 | Nakolan | 280—150 |
| 3,312,502 | 4/1967 | Coe | 297—385 |
| 3,318,634 | 5/1967 | Nicholas | 280—150 |

JAMES T. McCALL, *Primary Examiner.*